(12) United States Patent
Kishiyama et al.

(10) Patent No.: US 9,674,770 B2
(45) Date of Patent: Jun. 6, 2017

(54) COMMUNICATION SYSTEM, MOBILE TERMINAL APPARATUS, LOCAL AREA BASE STATION APPARATUS AND COMMUNICATION METHOD

(71) Applicant: NTT DOCOMO, INC., Tokyo (JP)

(72) Inventors: Yoshihisa Kishiyama, Tokyo (JP); Anass Benjebbour, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/390,201

(22) PCT Filed: Apr. 3, 2013

(86) PCT No.: PCT/JP2013/060213
§ 371 (c)(1),
(2) Date: Oct. 2, 2014

(87) PCT Pub. No.: WO2013/151092
PCT Pub. Date: Oct. 10, 2013

(65) Prior Publication Data
US 2015/0119027 A1    Apr. 30, 2015

(30) Foreign Application Priority Data

Apr. 6, 2012   (JP) ................................. 2012-087590

(51) Int. Cl.
*H04W 48/16*     (2009.01)
*H04W 48/18*     (2009.01)
(Continued)

(52) U.S. Cl.
CPC .......... *H04W 48/16* (2013.01); *H04W 48/18* (2013.01); *H04W 84/10* (2013.01); *H04W 48/12* (2013.01)

(58) Field of Classification Search
CPC ..... H04W 48/16; H04W 48/18; H04W 76/00; H04W 8/00; H04W 84/10; H04W 48/12
See application file for complete search history.

(56) References Cited

U.S. PATENT DOCUMENTS

| 2008/0069033 A1* | 3/2008 | Li .......................... H04W 48/16 370/328 |
| 2008/0225993 A1* | 9/2008 | Malladi ................. H04L 5/0007 375/340 |

(Continued)

FOREIGN PATENT DOCUMENTS

| JP | 2004-120171 A | 6/2014 |
| WO | 2011085195 A1 | 7/2011 |

OTHER PUBLICATIONS

International Search Report for corresponding International Application No. PCT/JP2013/060213, mailed Jul. 9, 2013 (1 page).

(Continued)

*Primary Examiner* — Kashif Siddiqui
(74) *Attorney, Agent, or Firm* — Osha Liang LLP

(57) ABSTRACT

The present invention is designed to provide highly efficient local area radio access. In a communication system in which a mobile terminal apparatus (10) detects a local area base station apparatus (30) which the mobile terminal apparatus (10) will connect to, among local area base station apparatuses (30), the local area base station apparatuses (30) transmit detection signals to be used to detect the local area base station apparatus (30), to the mobile terminal apparatus (10), in the radio communication scheme for the local areas which is different from the radio communication scheme for the wide area, and also transmit associated control signals that are attached to the detection signals and that allow a local area to execute connection control by itself, to the mobile terminal apparatus (10), and (Continued)

the mobile terminal apparatus (10) receives the associated control signals only when detection signals that are secured for the connection control by the local area alone, among the detection signals, are received.

7 Claims, 10 Drawing Sheets

(51) Int. Cl.
    *H04W 84/10* (2009.01)
    *H04W 48/12* (2009.01)

(56) References Cited

U.S. PATENT DOCUMENTS

| | | | | |
|---|---|---|---|---|
| 2010/0254338 A1* | 10/2010 | Tanaka | .................. | H04W 48/12 370/329 |
| 2011/0281590 A1* | 11/2011 | Frederiksen | .......... | H04W 24/02 455/449 |
| 2012/0184311 A1* | 7/2012 | Yamamoto | .......... | H04W 56/002 455/502 |
| 2013/0044692 A1* | 2/2013 | Nory | .................. | H04L 25/0228 370/329 |
| 2013/0044693 A1* | 2/2013 | Lindh | .................. | H04L 5/0026 370/329 |
| 2013/0148620 A1* | 6/2013 | Nanri | .................. | H04W 74/006 370/329 |
| 2014/0038598 A1* | 2/2014 | Ren | ....................... | H04W 48/16 455/434 |
| 2015/0063234 A1* | 3/2015 | Park | ....................... | H04B 7/024 370/329 |

OTHER PUBLICATIONS

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).

Extended Search Report issued in corresponding European application No. 13772805.1, mailed Dec. 9, 2015 (14 pages).

NTT DOCOMO; "DL Signal Transmission Scheme for Additional Carrier Type"; 3GPP TSG RAN WG1 Meeting #68, R1-120399; Dresden, Germany; Feb. 6-10, 2012 (5 pages).

Office Action issued Dec. 27, 2016, in corresponding Japanese Patent Application No. 2016-020596 (10 pages).

\* cited by examiner

|  | WIDE AREA | LOCAL AREA |
|---|---|---|
| SPECTRUM EFFICIENCY | VERY IMPORTANT (LIMITED BW) | IMPORTANT (MAY NOT BE CRITICAL IF LARGE BW AVAILABLE) |
| MOBILITY | MEDIUM-TO-HIGH | LOW |
| COVERAGE | ESSENTIAL | WIDER IS BETTER |
| DL/UL RADIO LINKS | ASYMMETRIC | MORE SYMMETRIC |
| TRAFFIC LOAD | MORE UNIFORM (MANY USERS & CELL PLANNING) | MORE FLUCTUATED (LESS USERS & NON-UNIFORM DEPLOYMENTS) |

FIG.4

COMMUNICATION SYSTEM, MOBILE TERMINAL APPARATUS, LOCAL AREA BASE STATION APPARATUS AND COMMUNICATION METHOD

TECHNICAL FIELD

The present invention relates to a communication system, a mobile terminal apparatus, a local area base station apparatus and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Furthermore, successor systems of LTE are also under study for the purpose of achieving further broadbandization and higher speed beyond LTE (referred to as, for example, "LTE-advanced" or "LTE enhancement" (hereinafter referred to as "LTE-A")). In LTE-A (Rel-10), carrier aggregation to make a broad band by grouping a plurality of component carriers (CCs), where the system band of the LTE system is one unit, is used. Also, in LTE-A, a HetNet (Heterogeneous Network) configuration to use an interference coordination technique (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In cellular systems such as W-CDMA, LTE (Rel. 8), and successor systems of LTE (for example, Rel. 9 and Rel. 10), the radio communication schemes (radio interfaces) are designed to support wide areas. In the future, it is expected that high-speed wireless services by means of near-field communication supporting local areas such as indoors, shopping malls and so on, in addition to cellular environment such as given above, will be provided. Consequently, there is a demand to design new radio communication schemes that are specifically designed for local areas, so that capacity can be secured with local areas while coverage is secured with a wide area.

The present invention has been made in view of the above, and it is therefore an object of the present invention to provide a communication system, a local area base station apparatus, a mobile terminal apparatus, and a communication method that can provide highly efficient local area radio access.

Solution to Problem

The communication system of the present invention is a communication system in which a mobile terminal apparatus detects a local area base station apparatus to which the mobile terminal apparatus will connect, among local area base station apparatuses covering local areas that are independent from a wide area, and, in this communication system, the local area base station apparatuses transmit detection signals to be used to detect the local area base station apparatus, to the mobile terminal apparatus, in a radio communication scheme for the local areas, which is different from a radio communication scheme for the wide area, and also transmit associated control signals that are attached to the detection signals and that allow a local area to execute connection control by itself, to the mobile terminal apparatus, and the mobile terminal apparatus receives the associated control signals only when detection signals that are secured for the connection control by the local area alone, among the detection signals, are received.

Technical Advantage of the Invention

According to the present invention, a local area can establish connection between a local area base station apparatus and a mobile terminal apparatus by itself, by means of associated control signals that are attached to detection signals and transmitted. Consequently, even a local area that is arranged outside a wide area can establish connection all by itself, without support from the wide area. It is possible to differentiate and use detection signals that are secured for the connection control by the local area alone, and other detection signals, so that it is possible to control the reception of associated control signals by the mobile terminal apparatus in accordance with the detection signals. Consequently, it is possible to allow the mobile terminal apparatus to disregard unwanted associated control signals except when the local area establishes connection by itself.

BRIEF DESCRIPTION OF THE DRAWINGS

FIG. 4 shows a table to list differences between a wide area and a local area;

DESCRIPTION OF EMBODIMENTS

Figure 1:
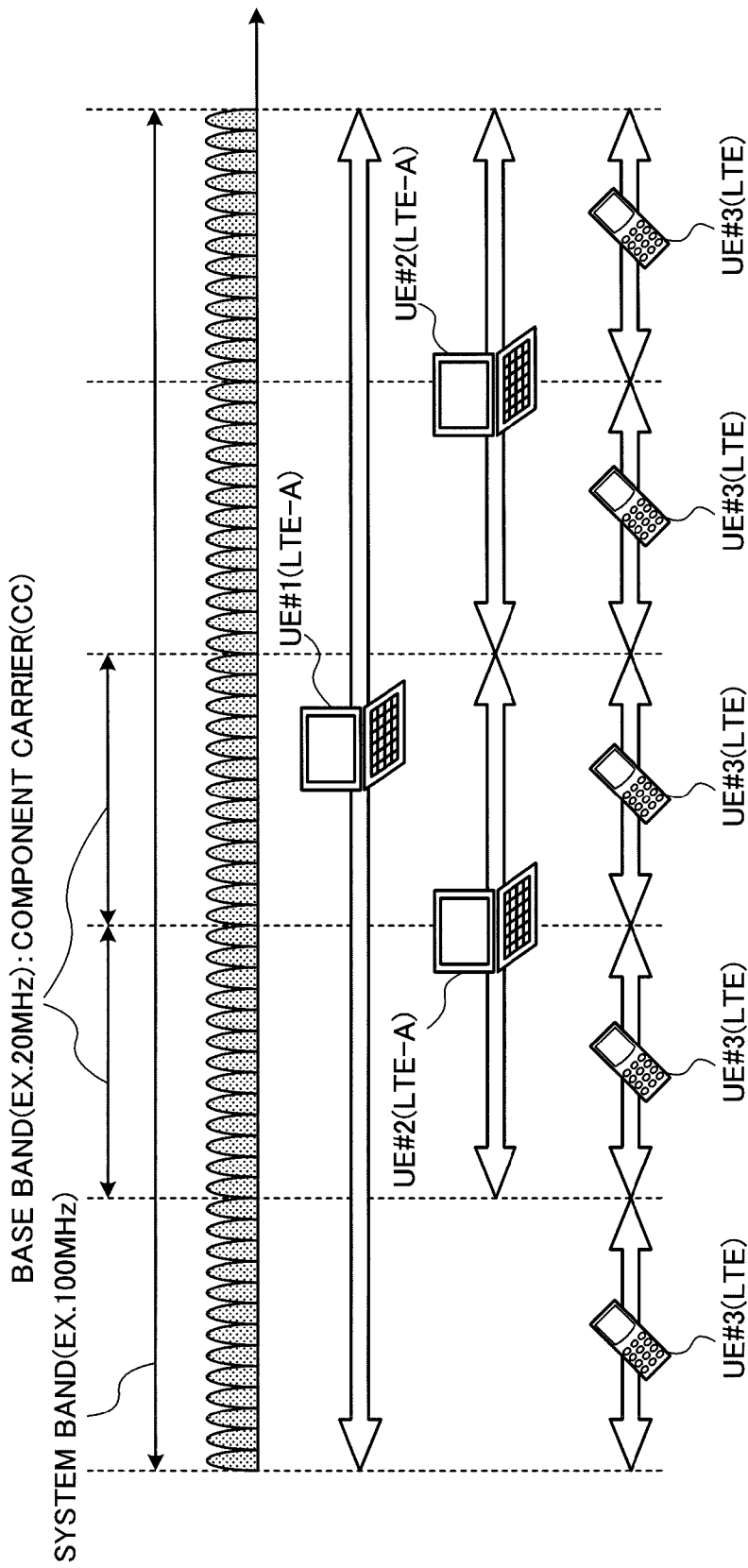
FIG. 1 is a diagram to explain a system band in an LTE-A system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Figure 2:
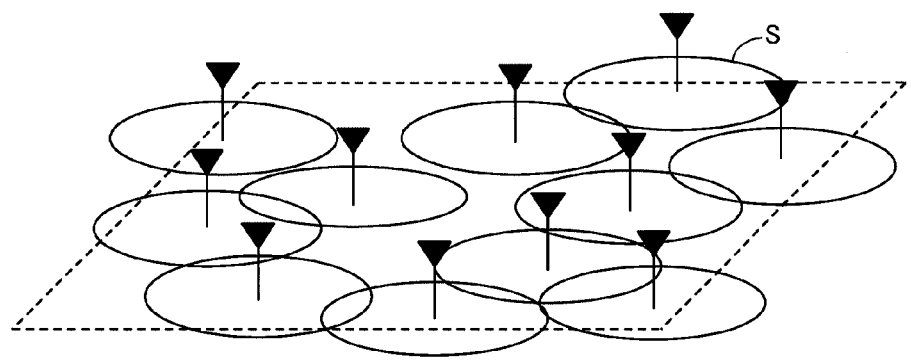
FIG. 2 is a diagram to show a configuration to arrange many small cells in a macro cell.

Future systems may anticipate a configuration to arrange numerous small cell S's in a macro cell, just as shown in FIG. 2. In this case, the small cell S's need to be designed taking into account capacity versus network costs. The network costs may include, for example, the cost of installing the network nodes, backhaul link and so on, the operation cost for cell planning and maintenance support, the power consumption on the network side, and so on. As demands apart from capacity, small cell S's are required to support saved power consumption on the mobile terminal apparatus side, random cell planning, and so on.

Figure 3A:
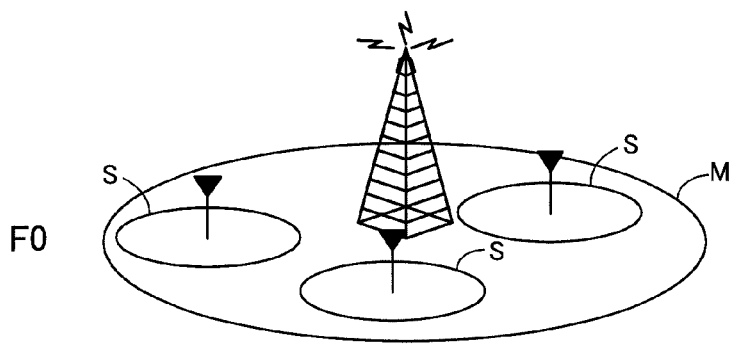
FIG. 3 provides diagrams to show two kinds of heterogeneous network configurations.
Figure 3B:
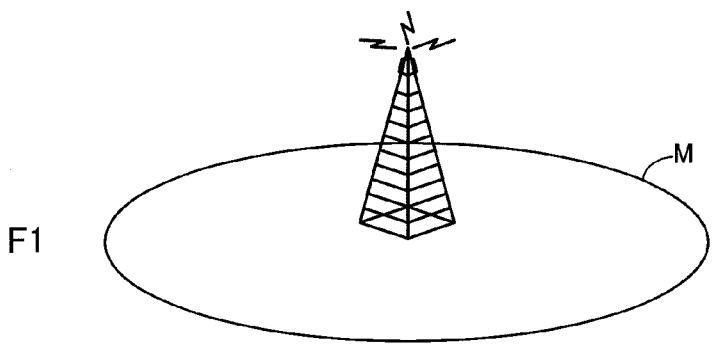
Figure 3B:
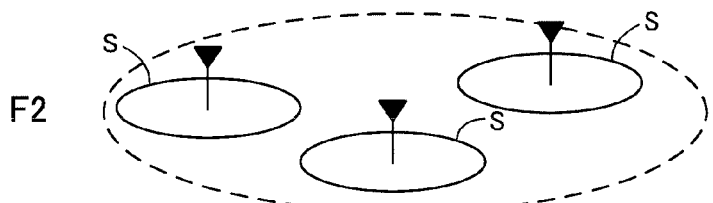

When small cell S's are arranged in a macro cell M, two kinds of heterogeneous network (hereinafter referred to as "HetNet") configurations may be possible, as shown in FIGS. 3A and 3B. In the first HetNet configuration shown in FIG. 3A, the small cell S's are arranged such that the macro cell M and the small cell S's use the same carrier. In the second HetNet configuration shown in FIG. 3B, the small cell S's are arranged such that the macro cell M and the small cell S's use different carriers. In the second HetNet configuration, the small cell S's use a dedicated carrier, so that it is possible to secure coverage with the macro cell M and secure capacity with the small cell S's. It is expected that, in the future (Rel. 12 and later versions), this second HetNet configuration will become more important.

As shown in FIG. 4, in the second HetNet configuration, varying demands and differences in configuration may exist between the wide area (macro cell) and the local areas (small cells). A wide area has a limited bandwidth, so that spectral efficiency is very important. By contrast with this, it is easy to take a wide bandwidth with a local area, so that, if a wide bandwidth can be secured, the significance of spectral efficiency is not as high as in a wide area. While a wide area needs to support high mobility such as represented by cars and/or the like, a local area has only to support low mobility. A wide area needs to secure wide coverage. Although it is preferable to secure wide coverage with a local area as well, a wide area can cover up the shortage of coverage.

Although, in a wide area, the uplink-downlink power difference is significant and the uplink and the downlink are asymmetrical, in a local area, the uplink-downlink power difference is insignificant, and the uplink and the downlink are nearly symmetrical. In a wide area, the number of connecting users per cell is high and cell planning is applied, so that there is little variation of traffic. By contrast with this, in a local area, the number of connecting users per cell is low, and furthermore there is a possibility that cell planning is not applied, so that there is significant variation of traffic. In this way, since optimal requirements for a local area are different from those of a wide area, it is necessary to design radio communication schemes that are specifically designed for local areas.

Figure 5:
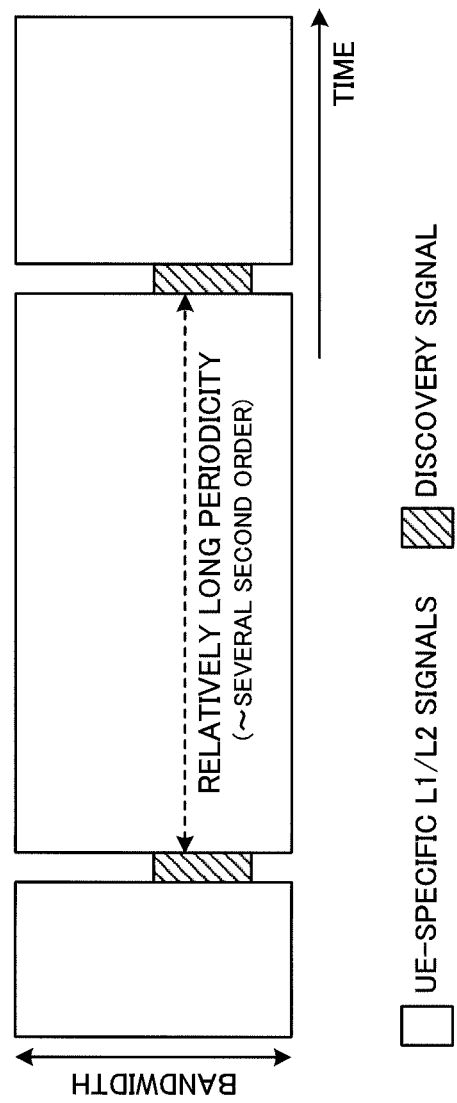
FIG. 5 is a diagram to show a local area radio communication scheme.

Considering interference that arises from saved power consumption and random cell planning, it is preferable to configure a radio communication scheme for local areas to assume non-transmission when there is no traffic. Consequently, as shown in FIG. 5, a radio communication scheme for local areas is expected to be designed as UE-specific as possible. Consequently, a radio communication scheme for local areas is designed based on EPDCCHs (Enhanced Physical Downlink Control Channels) and DM-RSs (Demodulation—Reference Signals), without using PSS/SSSs (Primary Synchronization Signal/Secondary Synchronization Signals), CRSs (Cell-specific Reference Signals), PDCCHs (Physical Downlink Control Channels) and so on in LTE.

An EPDCCH refers to a predetermined frequency band that lies within the PDSCH region (data signal region) and that is used as a PDCCH region (control signal region). EPDCCHs allocated in the PDSCH region are demodulated using DM-RSs. Note that an EPDCCH may be referred to as an "FDM-type PDCCH" or may be referred to as a "UE-PDCCH." Although, in a radio communication scheme for local areas, a new carrier that is different from conventional carriers is used, this new carrier may be referred to as an additional carrier or may be referred to as an extension carrier. In FIG. 5, the PDSCH (Physical Downlink Shared Channel), EPDCCHs, DM-RSs and so on are shown as UE-specific L1/L2 signals.

When everything is designed UE-specific in a radio communication scheme for local areas, a mobile terminal apparatus cannot have the opportunity to make initial access to the local areas. Consequently, in a radio communication scheme for local areas, too, it is necessary to provide cell-specific synchronization signals. The synchronization signals are transmitted in a relatively long cycle on the order of several seconds, so that the mobile terminal apparatus can save battery. Normally, mobile terminal apparatus receives control information from the wide area and identifies the times to receive synchronization signals from each local area. Then, the mobile terminal apparatus measures each local area's received signal power at these times of reception. The mobile terminal apparatus is assigned an adequate local area (transmission point) in accordance with the received signal power of synchronization signals.

HetNet configurations such as ones described above are based on the premise that a wide area and local areas coordinate, and connection control by a local area alone (stand-alone), with a mobile terminal apparatus, is not taken into account. For example, when a local area is placed outside a wide area, it is not possible to receive support from the wide area with respect to the control of connection of a mobile terminal apparatus to the local area. So, the present inventors have arrived at the present invention in order to allow the local area to execute connection control all by itself, without support from the wide area. That is, a gist of the present invention is to enable a local area to execute connection control by itself, by means of control signals that are attached to the synchronization signal for the local area, instead of control signals for support that are reported in the wide area.

Now, downlink control signals for a local area and initial connection schemes to use these control signals will be described below with reference to FIG. 6 to FIG. 9. In the following description, in the radio communication scheme for a local area, the synchronization signal for the local area will be referred to as the "discovery signal." Also, in the radio communication scheme for the local area, the uplink channel that is defined to report discovery signal measurement results will be referred to as the "DACH" (Direct Access Channel). Also, control signals that are attached to discovery signals and transmitted in order to realize connection control with the local area alone will be referred to as associated control signals.

The discovery signal may be referred to as, for example, the PDCH (Physical Discovery Channel), the BS (Beacon Signal), the DPS (Discovery Pilot Signal) and so on. Also, the DACH and associated control signals are not limited to particular names. The radio communication scheme may be referred to as a "radio interface" or may be referred to as a "radio interface scheme." The wide area may be a macro cell, a sector and/or the like. The local area may be a small cell, a pico cell, a nano cell, a femto cell, a micro cell and so on, and may be provided indoors as well as outdoors.

Figure 6:
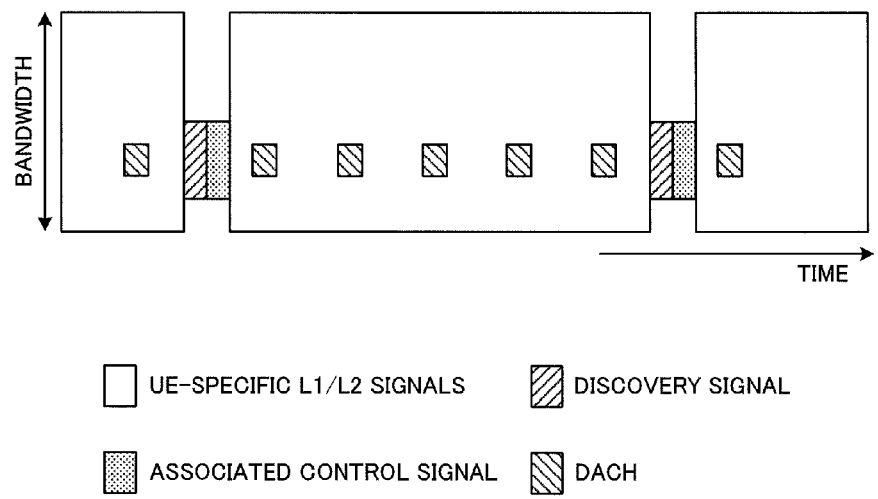
FIG. 6 is a diagram to show an arrangement configuration of associated control signals.

Discovery signals and associated control signals will be described with reference to FIG. 6. In the radio communication scheme for the local area, discovery signals are transmitted in a long cycle so that a mobile terminal apparatus is able to reduce the number of times of measurement and save battery. In this radio communication scheme, associated control signals are transmitted following discovery signals in the time axis direction. In the radio communication scheme, while downlink discovery signals are transmitted in a long cycle, radio resources are allocated to the uplink DACH with comparatively high frequency (in a short cycle). By means of this DACH used with high frequency, uplink connection is established quickly when traffic is produced in a mobile terminal apparatus.

As for the frequency to allocate the DACH, the configuration to allocate the DACH with higher frequency (in a shorter cycle) than discovery signals is not necessarily limiting, and it is equally possible to allocate the DACH with the same frequency (in a long cycle) as discovery signals. Also, associated control signals do not necessarily have to be transmitted following discovery signals, and may be transmitted at intervals from discovery signals in the time axis direction.

Associated control signals are reported from the local area in independent mode with the local area alone (stand-alone mode), instead of the control signals reported from the wide area in normal mode. With associated control signals, for example, control information for DACH transmission and control information for EPDCCH reception are reported. The control information for DACH transmission includes, for example, radio resources and DM-RS sequences for transmission to the local area base station apparatus through the DACH. The control information for EPDCCH reception includes, for example, radio resources and DM-RS sequences for reception from the local area base station apparatus through EPDCCHs.

Figure 7:
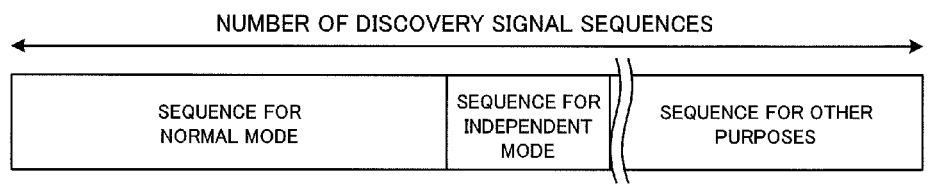
FIG. 7 is a diagram to show the state of allocation of discovery signal sequences in each operation mode.

However, radio resources and signal sequences for specifying and receiving discovery signals are not reported to the mobile terminal apparatus, as control information for discovery signal reception. Consequently, in independent mode, the mobile terminal apparatus needs to detect the discovery signals of all local areas. Consequently, as shown in FIG. 7, discovery signals are divided into sequences for normal mode and sequences for independent mode, and the number of discovery signal sequences secured for independent mode is smaller than those secured for normal mode. By this means, the load of detection in the mobile terminal apparatus is lightened by reducing the number of discovery signal sequences which the mobile terminal apparatus detects in independent mode.

Each discovery signal sequence is associated with a sequence number. For example, the discovery signals of sequence numbers 1 to 504 are secured for normal mode, and the discovery signals of sequence numbers 505 to 520 are secured for independent mode. Also, the discovery signals of and after sequence number 521 may be secured for other future use, such as D2D discovery (device-to-device discovery) and so on. The mobile terminal apparatus identifies between normal mode and independent mode based on the sequence numbers of discovery signals. Note that the number of discovery signal sequences to be secured may be smaller in normal mode than in independent mode.

The discovery signals are by no means limited to the configuration to identify between normal mode and independent mode based on sequence numbers. For example, cell IDs and discovery signals may be associated with each other, or discovery signals for normal mode and discovery signals for independent mode may be identified based on the arrangement configuration of discovery signals.

In normal mode, by means of control signals from the wide area, control information for discovery signal reception is reported to the mobile terminal apparatus, in addition to the control information for DACH transmission and control information for EPDCCH reception. The control information for discovery signal reception includes, for example, radio resources and signal sequences for receiving discovery signals from each local area. Consequently, the mobile terminal apparatus receives discovery signals for normal mode based on control signals from the wide area. The mobile terminal apparatus receives the control signals from the wide area, so that, when receiving discovery signals for normal mode, the mobile terminal apparatus understands that there is no associated control signal, and does not receive these signals.

In independent mode, no control signal is transmitted from the wide area to the mobile terminal apparatus, and therefore the control information for discovery signal reception is not reported. Consequently, the mobile terminal apparatus receives all of a small number of discovery signals secured for independent mode. Also, since the mobile terminal apparatus does not receive control signals from the wide area, when discovery signals for independent mode are received, the mobile terminal apparatus receives the associated control signals. The associated control signals include control information for DACH transmission and control information for EPDCCH reception, for executing subsequent connection control.

Figure 8:
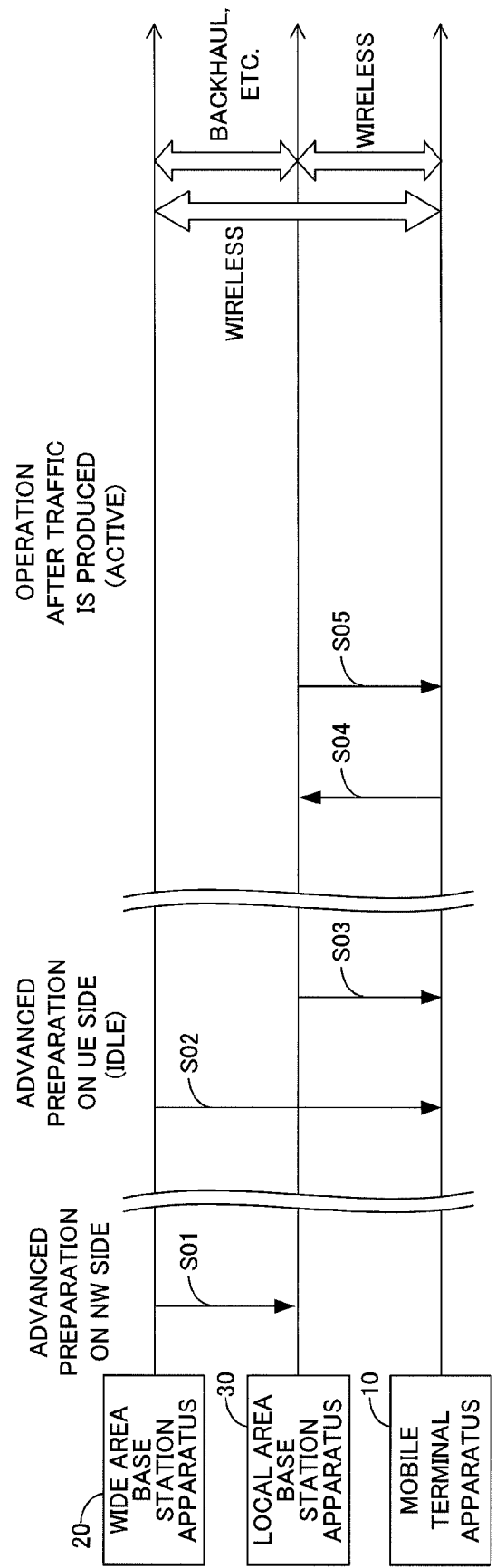
FIG. 8 is a sequence diagram to show an example of an initial connection scheme in normal mode.

An example of an initial connection scheme in normal mode will be described with reference to FIG. 8, for comparison with independent mode. Note that, although, in the following example, a configuration to specify, in the mobile terminal apparatus 10, the local area base station apparatus 30 which the mobile terminal apparatus 10 will connect to, will be described, it is equally possible to assign the target of connection for the mobile terminal apparatus 10 in the wide area base station apparatus 20 as well. In the following description, a configuration to place a local area in a wide area will be exemplified (see FIG. 10). As shown in FIG. 8, the wide area base station apparatus 20 and each local area base station apparatus 30 are connected by means of a backhaul link and/or the like (for example, an X2 interface), and the mobile terminal apparatus 10 is able to receive radio signals from the wide area and each local area.

For advanced preparation on the network side, each local area base station apparatus 30 receives control information for discovery signal transmission from the wide area base station apparatus 20, via the backhaul link, and transmits discovery signals periodically (step S01). The control information for discovery signal transmission includes, for example, radio resources and signal sequences for transmitting discovery signals to the mobile terminal apparatus 10.

The signal sequence of the discovery signal is set for each local area, and the local areas are identified by this signal sequence. Also, signal sequences of discovery signals are divided into ones for normal mode and ones for independent mode in accordance with sequence numbers. For example, the local area in the wide area are assigned sequence numbers for normal mode, and the local area outside the wide area are assigned sequence numbers for independent mode.

Next, in an idle state, the mobile terminal apparatus 10 receives control signals from the wide area base station apparatus 20 (step S02). The mobile terminal apparatus 10 receives, through the control signals, control information for discovery signal reception, control information for DACH transmission, and control information for EPDCCH reception. The control information for discovery signal reception includes, for example, radio resources and signal sequences for receiving discovery signals from each local area base station apparatus 30. The control information for DACH transmission includes, for example, radio resources and DM-RS sequences for transmission to the local area base station apparatus 30 through the DACH. The control information for EPDCCH reception includes, for example, radio resources and DM-RS sequences for reception from the local area base station apparatus 30 through EPDCCHs.

The mobile terminal apparatus 10 prepares to receive the discovery signals by means of the control information for discovery signal reception received from the wide area base station apparatus 20. Next, in an idle state, the mobile terminal apparatus 10 receives the discovery signals from each local area base station apparatus 30, and measures the received signal power from each local area base station apparatus 30 periodically (step S03). Then, from the measured received signal power, the mobile terminal apparatus 10 specifies the local area base station apparatus 30 having the highest received signal power. At this time, the mobile terminal apparatus 10 identifies the discovery signals for normal mode based on the signal sequences, and disregards the associated control signals from the local area base station apparatus 30. As traffic is produced in the mobile terminal apparatus 10, the mobile terminal apparatus 10 shifts from an idle state to an active state.

Upon the shift to an active state, the discovery signal measurement results and user IDs are transmitted from the mobile terminal apparatus 10 to the nearest (top) local area base station apparatus 30 through the DACH (step S04). In this case, by means of the control information for DACH transmission received from the wide area base station apparatus 20 in step S02, the mobile terminal apparatus 10 is prepared in advance for transmission using the DACH. Also, the user IDs may be IDs that are randomly selected by the mobile terminal apparatus 10 (for example, RACH-IDs).

Then, from the nearest local area base station apparatus 30 to the mobile terminal apparatus 10, downlink control signals are transmitted through a control channel (EPDCCH) and user data is transmitted through a data channel (PDSCH) (step S05). In this case, by means of the control information for EPDCCH reception received from the wide area base station apparatus 20 in step S02, the mobile terminal apparatus 10 is prepared in advance for reception using EPDCCHs.

Although a configuration is presented here where the local area base station apparatus 30 to connect to is specified on the mobile terminal apparatus 10 side, this configuration is by no means limiting. For example, it is equally possible to receive the discovery signal measurement results of the top several stations from the mobile terminal apparatus 10 in the wide area base station apparatus 20, and determine the target of connection for the mobile terminal apparatus 10 on the wide area side taking into account the load balance between the local areas.

Figure 9:
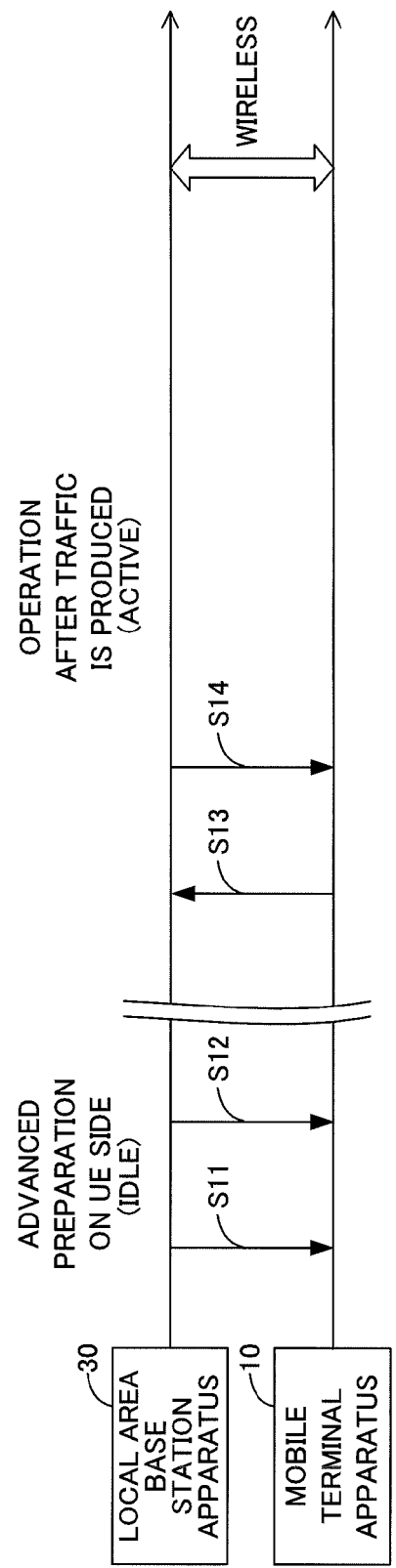
FIG. 9 is a sequence diagram to show an example of an initial connection scheme in independent mode.

An example of an initial connection scheme in independent mode will be described with reference to FIG. 9. Also, in the following description, an example of a configuration to place a local area outside a wide area will be shown (see FIG. 10). As shown in FIG. 9, the mobile terminal apparatus 10 is located in a local area outside a wide area, and therefore is able to receive radio signals from each local area base station apparatus 30, without receiving radio signals from the wide area base station apparatus 20.

In an idle state, the mobile terminal apparatus 10 receives the discovery signals from each local area base station apparatus 30, and measures the received signal power from each local area base station apparatus 30 periodically (step S11). At this time, the mobile terminal apparatus 10 identifies the discovery signals for independent mode based on the signal sequences, and measures the received signal power of all independent mode discovery signals. Then, the mobile terminal apparatus 10 specifies the local area base station apparatus 30 having the highest received signal power from the measured received signal power.

The signal sequence of the discovery signal is set for each local area, and the local areas are identified by this signal sequence. Also, the signal sequences of discovery signals are divided into ones for normal mode and ones for independent mode, depending on sequence numbers. For example, the local area in the wide area are assigned sequence numbers for normal mode, and the local areas outside the wide area are assigned sequence numbers for independent mode.

Next, when the mobile terminal apparatus 10 receives discovery signals for independent mode in an idle state, the mobile terminal apparatus 10 receives associated control signal from the local area base station apparatus 30 (step S12). Control information for DACH transmission and control information for EPDCCH reception are reported to the mobile terminal apparatus 10 by means of the associated control signals. The control information for DACH transmission includes, for example, radio resources and DM-RS sequences for transmission to the local area base station apparatus 30 through the DACH. The control information for EPDCCH reception includes, for example, radio resources and DM-RS sequences for reception from the local area base station apparatus 30 through EPDCCHs. Then, as traffic is produced in the mobile terminal apparatus 10, the mobile terminal apparatus 10 shifts from an idle state to an active state.

Upon the shift to an active state, the discovery signal measurement results and user IDs are transmitted from the mobile terminal apparatus 10 to the nearest (top) local area base station apparatus 30 through the DACH (step S13). In this case, by means of the control information for DACH transmission received from the local area base station apparatus 30 in step S12, the mobile terminal apparatus 10 is prepared in advance for transmission using the DACH. Also, the user IDs may be IDs that are randomly selected by the mobile terminal apparatus 10 (for example, RACH-IDs).

Then, from the nearest local area base station apparatus 30 to the mobile terminal apparatus 10, downlink control signals are transmitted through a control channel (EPDCCH) and user data is transmitted through a data channel (PDSCH) (step S14). In this case, by means of the control information for EPDCCH reception received from the local area base station apparatus 30 in step S12, the mobile terminal apparatus 10 is prepared in advance for reception using EPDCCHs.

In this way, even in independent mode, a local area can complete the procedures for initial connection all by itself, by receiving associated control signals from the local area base station apparatus 30. Consequently, it is possible to place local areas outside the wide area. Also, in normal mode, it is possible to allow the mobile terminal apparatus 10 to disregard unwanted associated control signals from the local area base station apparatus 30. The independent mode is a mode to allow a local area to operate in an independent state from a wide area, and is not limited to a configuration to place a local area outside a wide area. For example, even within a wide area, a mode to allow operation in a state disconnected to the wide area may be possible.

Although each operation mode described above is configured to measure the received signal power of discovery signals, this configuration is by no means limiting. Each operation mode described above may determine the local area base station apparatus 30 which the mobile terminal apparatus 10 will connect to, by measuring the received quality of discovery signals.

Figure 10:
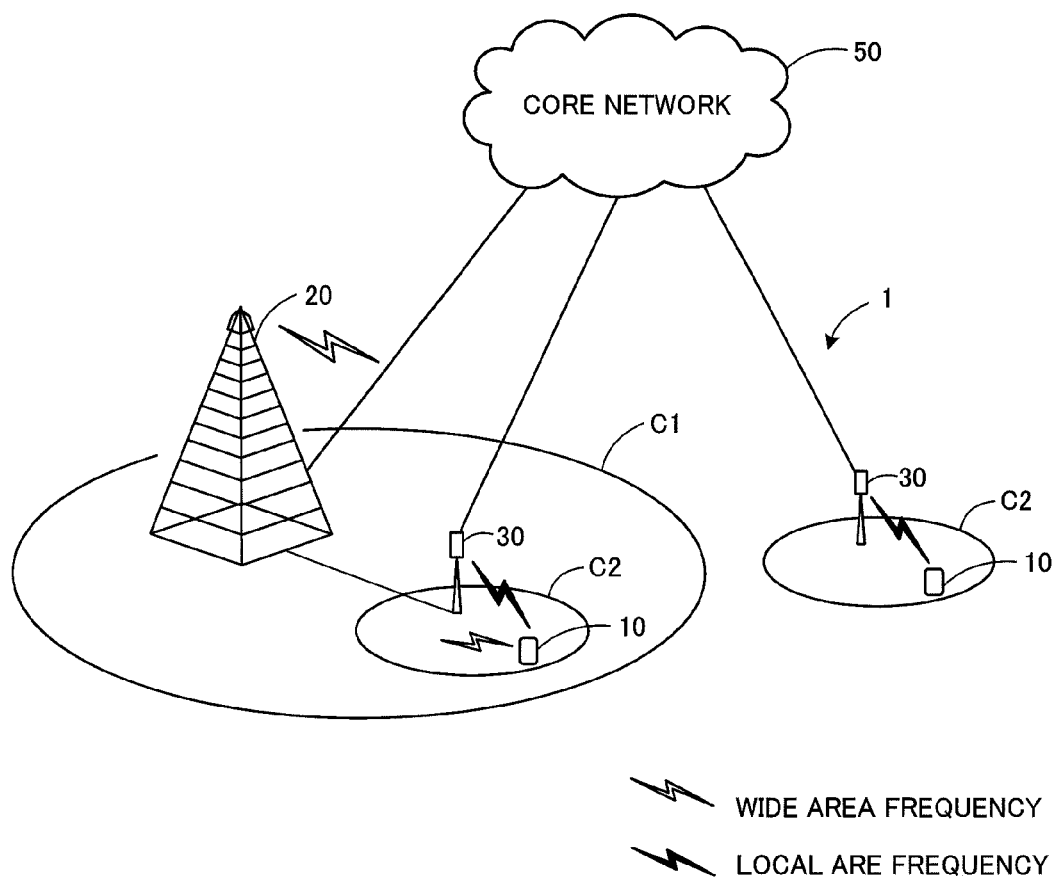
FIG. 10 is a diagram to explain a system configuration of a radio communication system.

The radio communication system according to the present embodiment will be described in detail. FIG. 10 is a diagram to explain a system configuration of a radio communication system according to the present embodiment. Note that the radio communication system shown in FIG. 10 is a system to accommodate, for example, the LTE system or SUPER 3G. This radio communication system supports carrier aggregation to group a plurality of fundamental frequency blocks into one, where the system band of the LTE system is one unit. Also, this radio communication system may be referred to as "IMT-Advanced," or may be referred to as "4G," "FRA" (Future Radio Access) and so on.

As shown in FIG. 10, the radio communication system 1 has a wide area base station apparatus 20 that covers a wide area C1, and a plurality of local area base station apparatuses 30 that cover a plurality of local areas C2 provided inside and outside the wide area C1. Also, in the wide area C1 and each local area C2, many mobile terminal apparatuses 10 are placed. The mobile terminal apparatuses 10 support the radio communication schemes for the wide area and the local areas, and are configured to be able to perform radio communication with the wide area base station apparatus 20 and the local area base station apparatuses 30.

Communication between the mobile terminal apparatuses 10 and the wide area base station apparatus 20 is carried out using the frequency for the wide area (for example, a low frequency band). Communication between the mobile terminal apparatuses 10 and the local area base station apparatuses 30 is carried out using the frequency for the local areas (for example, a high frequency band). Also, the wide area base station apparatus 20 and each local area base station apparatus 30 in the wide area C1 are connected with each other by wire connection or by wireless connection.

The wide area base station apparatus 20 and each local area base station apparatus 30 are connected with a higher station apparatus, which is not illustrated, and are connected to a core network 50 via a higher station apparatus. Note that the higher station apparatus may be, for example, an access gateway apparatus, a radio network controller (RNC), a mobility management entity (MME) and so on, but is by no means limited to these. Also, the local area base station apparatuses 30 in the wide area C1 may be connected with the higher station apparatus via the wide area base station apparatus 20.

Note that, although each mobile terminal apparatus 10 may be either an LTE terminal or an LTE-A terminal, in the following description, simply a mobile terminal apparatus will be described, unless specified otherwise. Also, although the mobile terminal apparatus will be described to perform radio communication with the wide area base station apparatus 20 and the local area base station apparatuses 30 for ease of explanation, more generally, user equipment (UE), including both mobile terminal apparatuses and fixed terminal apparatuses, may be used as well. Also, the local area base station apparatuses 30 and the wide area base station apparatus 20 may be referred to as wide area and local area transmission points. Note that the local area base station apparatuses 30 may be a remote optical base station apparatus.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. Downlink communication channels include a PDSCH (Physical Downlink Shared Channel), which is used by each mobile terminal apparatus 10 on a shared basis, and downlink L1/L2 control channels (PDCCH, PCFICH, PHICH). User data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each mobile terminal apparatus 10 on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 11:
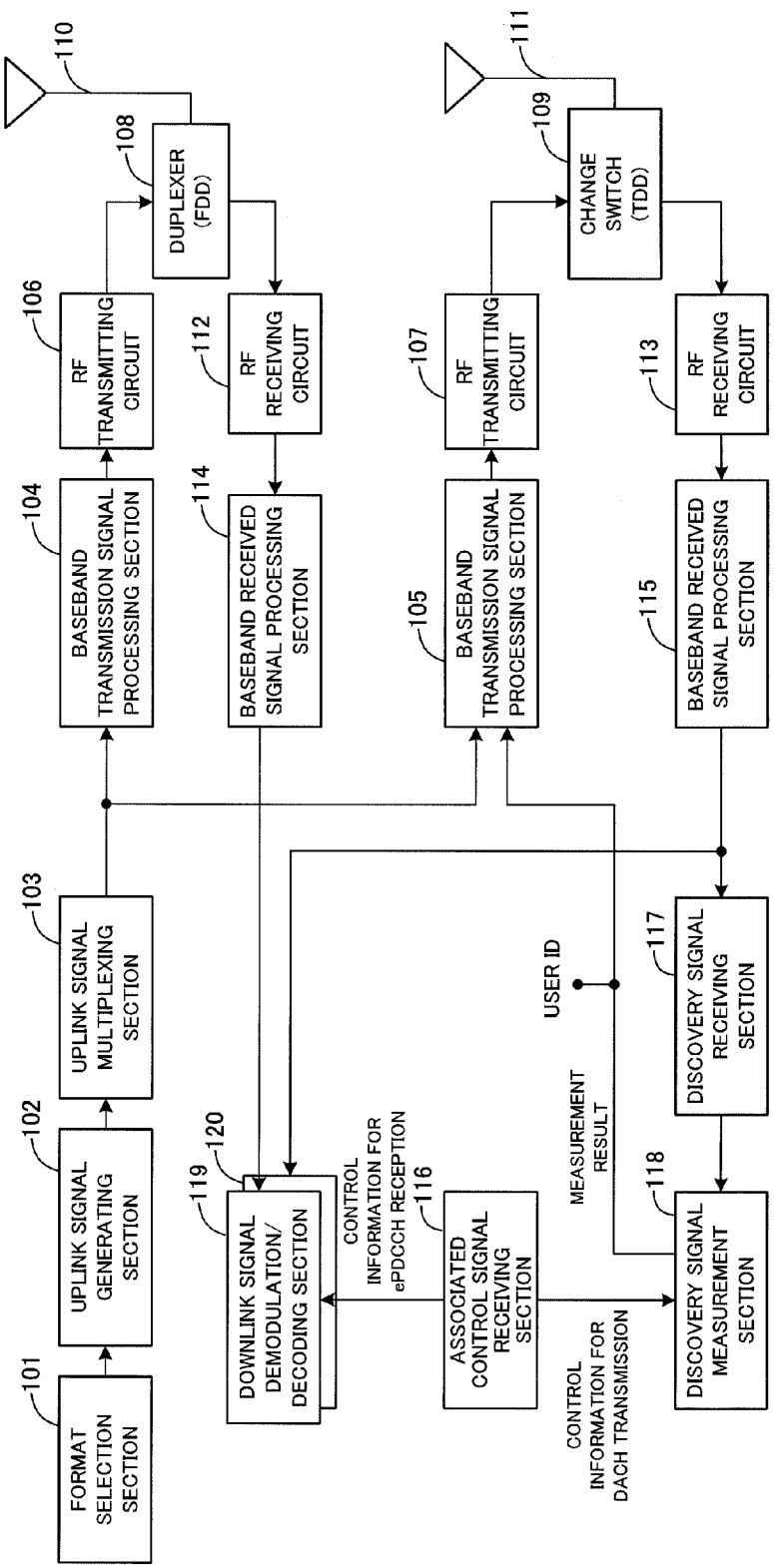
FIG. 11 is a diagram to show an overall configuration of a mobile terminal apparatus.
Figure 12:
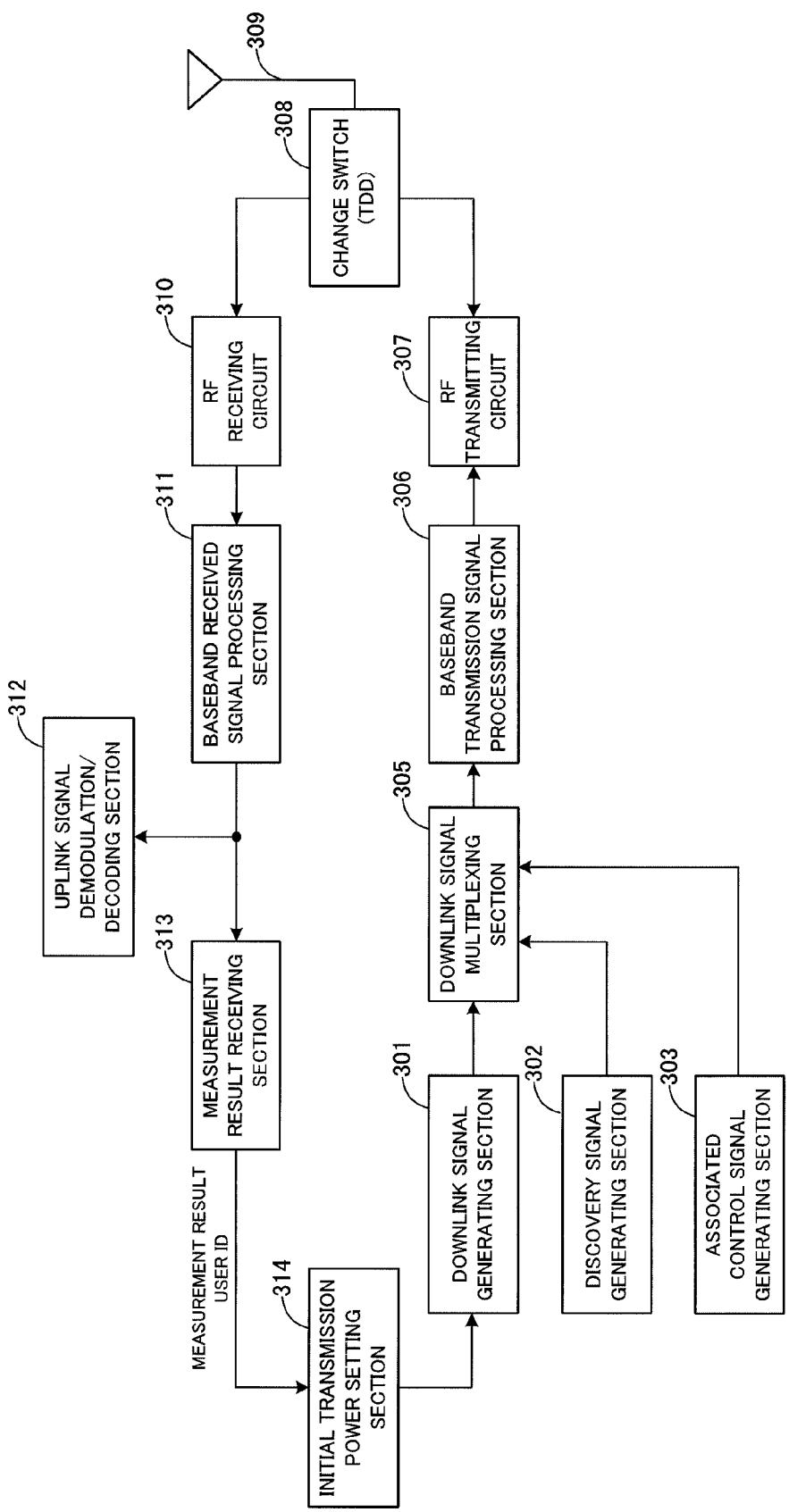
FIG. 12 is a diagram to show an overall configuration of a local area base station apparatus.

Now, overall configurations of a local area base station apparatus 30 of independent mode placed outside the wide area C1, and mobile terminal apparatus 10, will be described with reference to FIG. 11 and FIG. 12. Assume that the local area base station apparatus 30 is placed very close to the mobile terminal apparatus 10. As shown in FIG. 11, the mobile terminal apparatus 10 has, as processing sections of the transmitting sequence, a format selection section 101, an uplink signal generating section 102, an uplink signal multiplexing section 103, baseband transmission signal processing sections 104 and 105, and RF transmitting circuits 106 and 107.

The format selection section 101 selects the transmission format for the wide area and the transmission format for the local area. The uplink signal generating section 102 generates uplink data signals and reference signals. In the event of the transmission format for the wide area, the uplink signal generating section 102 generates the uplink data signal and reference signal for the wide area base station apparatus 20. Also, in the event of the transmission format for the local areas, the uplink signal generating section 102 generates the uplink data signal and reference signal for the local area base station apparatus 30. Note that, with the present configuration, the mobile terminal apparatus 10 is present outside the wide area C1, so that the format for the wide area is not selected.

The uplink signal multiplexing section 103 multiplexes the uplink transmission data and the reference signal. An uplink signal for the wide area base station apparatus 20 is input in the baseband transmission signal processing section 104, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 106, and is transmitted from a transmitting/receiving antenna 110 for the wide area, via a duplexer 108 that is provided between the transmitting sequence and the receiving sequence. In the transmitting/receiving sequences for the wide area, simultaneous transmission/reception is made possible by the duplexer 108. Note that, with the present configuration, the mobile terminal apparatus 10 is located outside the wide area C1, so that the uplink signals are not transmitted to the wide area base station apparatus 20.

An uplink signal for the local area base station apparatus 30 is input in the baseband transmission signal processing section 105, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from a transmitting/receiving antenna 111 for the wide area, via a change switch 109 that is provided between the transmitting sequence and the receiving sequence. In the transmitting/receiving sequences for the local areas, transmission and reception are switched by a change switch 109.

Note that, although the present embodiment is configured to provide the duplexer 108 in the transmitting/receiving sequences for the wide area and provide the change switch 109 in the transmitting/receiving sequences for the local areas, this configuration is by no means limiting. It is equally possible to provide the change switch 109 in the wide area transmitting/receiving sequence and provide the duplexer 108 in the local area transmitting/receiving sequence. Also, uplink signals for the wide area and the local areas may be transmitted simultaneously from the transmitting/receiving antennas 110 and 111, or may be transmitted separately by switching between the transmitting/receiving antennas 110 and 111.

Also, the mobile terminal apparatus 10 has, as processing sections of the receiving sequence, RF receiving circuits 112 and 113, baseband received signal processing sections 114 and 115, a discovery signal receiving section 117, an associated control signal receiving section 116, a discovery signal measurement section 118, and downlink signal demodulation/decoding sections 119 and 120.

A downlink signal from the wide area base station apparatus 20 is received at the wide area transmitting/receiving antenna 110. This downlink signal is input in the baseband received signal processing section 114 via the duplexer 108 and the RF receiving circuit 112, and subjected to digital signal processing. For example, in the event of a downlink signal of the OFDM scheme, the cyclic prefixes are removed, and the signal is converted from a time sequence signal to a frequency domain signal through a fast Fourier transform (FFT). The downlink data signal for the wide area is input in the downlink signal demodulation/decoding section 119, and decoded (descrambled) and demodulated in the downlink signal demodulation/decoding section 119. Note that, with the present configuration, the mobile terminal apparatus 10 is located outside the wide area C1, so that downlink signals from the wide area base station apparatus 20 are not received.

A downlink signal from the local area base station apparatus 30 is received in the transmitting/receiving antenna 111 for the local areas. This downlink signal is input in the baseband received signal processing section 115 via the change switch 109 and the RF receiving circuit 113, and is subjected to digital signal processing. For example, in the event of a downlink signal of the OFDM scheme, the cyclic prefixes are removed, and the signal is converted from a time sequence signal to a frequency domain signal through a fast Fourier transform (FFT).

The discovery signal receiving section 117 receives discovery signals from each local area base station apparatus 30. The discovery signal receiving section 117 identifies between discovery signals for normal mode and discovery signals for independent mode based on sequence numbers and so on. As for the discovery signals secured for independent mode, the discovery signal receiving section 117 receives all the signal sequences and outputs them to the discovery signal measurement section 118. Note that, with the present configuration, the mobile terminal apparatus 10 is located outside the wide area C1, discovery signals for normal mode are not received.

When discovery signals for independent mode are received in the discovery signal receiving section 117, the associated control signal receiving section 116 receives associated control signals from each local area base station apparatus 30. With the associated control signal, control information for DACH transmission and control information for EPDCCH reception are received. The associated control signal receiving section 116 outputs the control information for DACH transmission to the discovery signal measurement section 118, and outputs the control information for EPDCCH reception to the downlink signal demodulation/decoding section 120. Also, when discovery signals for normal mode are received in the discovery signal receiving section 117, the associated control signal receiving section 116 does not receive associated control signals from each local area base station apparatus 30.

The discovery signal measurement section 118 periodically measures the received signal power of the discovery signals received in the discovery signal receiving section 117. In independent mode, control information for receiving discovery signals (radio resources, signal sequences and so on) cannot be received from the wide area base station apparatus 20, so that the discovery signal measurement section 118 measures all the discovery signals for independent mode. Consequently, the number of discovery signal sequences secured in independent mode is smaller than in normal mode, so that the load of detection in the mobile terminal apparatus is lightened.

Also, among the discovery signals from each local area base station apparatus 30, the discovery signal measurement section 118 transmits the measurement result of the top station having the highest received signal power, to the local area base station apparatus 30, by means of the DACH. In this case, the discovery signal measurement section 118 specifies the local area of the transmission destination based on the signal sequences of discovery signals. The discovery signal measurement results are transferred to the local area base station apparatus 30 when the mobile terminal apparatus 10 shifts from an idle state to an active state. Also, in the DACH, user IDs are transmitted with the discovery signal measurement results.

Note that transmission by means of the DACH is carried out based on the control information for DACH transmission input from the associated control signal receiving section 116. The control information for DACH transmission includes, for example, radio resources and DM-RS sequences for transmission to the local area base station apparatus 30 by means of the DACH. The radio resource information includes, for example, the transmission interval, the frequency position, and the code of the DACH.

A downlink data signal for the local areas is input in the downlink signal demodulation/decoding section 120. Based on the control information for EPDCCH reception input from the associated control signal receiving section 116, the downlink signal demodulation/decoding section 120 decodes (descrambles) and demodulates the downlink control signal (EPDCCH) for the local area. The control information for EPDCCH reception includes, for example, radio resources and DM-RS sequences for reception from the local area base station apparatus 30 by means of EPDCCHs. The radio resource information includes, for example, the transmission interval, the frequency position, and the code of EPDCCHs.

Also, downlink signals for the wide area and the local areas may be received simultaneously from the transmitting/receiving antennas 110 and 111, or may be received separately by switching between the transmitting/receiving antennas 110 and 111.

An overall configuration of the local area base station apparatus 30 will be described with reference to FIG. 12. Assume that the local area base station apparatus 30 is placed very close to the mobile terminal apparatus 10. The local area base station apparatus 30 has, as processing sections of the transmitting sequence, a downlink signal generating section 301, a discovery signal generating section 302, an associated control signal generating section 303, a downlink signal multiplexing section 305, a baseband transmission signal processing section 306, and an RF transmitting circuit 307.

The downlink signal generating section 301 generates a downlink data signal (PDSCH), a reference signal, and a downlink control signal (EPDCCH). The discovery signals generating section 302 generates discovery signals secured for independent mode. The associated control signal generating section 303 generates associated control signals including control information for DACH transmission and control information for EPDCCH reception. By means of the associated control signals, control information for initial connection, which is transmitted from the wide area base station apparatus 20 in normal mode, is reported from the local area base station apparatus 30 to the mobile terminal apparatus 10.

The downlink signal multiplexing section 305 multiplexes the downlink transmission data, the reference signal and the downlink control signal. A downlink signal for the mobile terminal apparatus 10 is input in the baseband transmission signal processing section 306, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 307, and is transmitted from a transmitting/receiving antenna 309 via the change switch 308 that is provided between the transmitting sequence and the receiving sequence. Note that a duplexer may be provided instead of the change switch 308.

The local area base station apparatus 30 has, as processing sections of the receiving sequence, an RF receiving circuit 310, a baseband received signal processing section 311, an uplink signal demodulation/decoding section 312, and a measurement result receiving section 313. Also, the local area base station apparatus 30 has an initial transmission power setting section 314.

An uplink signal from the mobile terminal apparatus 10 is received in the transmitting/receiving antenna 309 for the local areas, and input in the baseband received signal processing section 311 via the change switch 308 and the RF receiving circuit 310. In the baseband received signal processing section 311, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 312, and decoded (descrambled) and demodulated in the uplink signal demodulation/decoding section 312.

The measurement result receiving section 313 receives the discovery signal measurement results and user IDs from the uplink signal. Based on the discovery signal measurement results (received signal power) and user IDs, the initial transmission power setting section 314 sets the initial transmission power of the downlink data signal (PDSCH) and downlink control signal (EPDCCH) in the downlink signal generating section 301.

As described above, with the radio communication system 1 according to the present embodiment, a local area can establish connection between the local area base station apparatus 30 and the mobile terminal apparatus 10 all by itself, by means of associated control signals that are attached to discovery signals and transmitted. Consequently, even in a local area C2 that is placed outside the wide area C1, the local area C2 is able to establish connection all by itself, without support from the wide area C1. Also, detection signals that are secured for connection control by the local area C2 alone and other detection signals are used differently, so that it is possible to control the reception of associated control signals by the mobile terminal apparatus 10 in accordance with the detection signals. Consequently, it is possible to allow the mobile terminal apparatus 10 to disregard unwanted associated control signals except when the local area C2 establishes connection all by itself.

The present invention is by no means limited to the above embodiment and can be implemented in various modifications. For example, without departing from the scope of the present invention, it is possible to adequately change the number of carriers, the bandwidth of carriers, the signaling method, the number of processing sections, and the order of processing steps in the above description, and implement the present invention. Besides, the present invention can be implemented with various changes, without departing from the scope of the present invention.

The disclosure of Japanese Patent Application No. 2012-087590, filed on Apr. 6, 2012, including the specification, drawings and abstract, is incorporated herein by reference in its entirety.

The invention claimed is:

1. A mobile terminal apparatus comprising:
    a receiving section that receives a detection signal that is to be used to detect a base station apparatus and an associated control signal that is attached to the detection signal and is to be used to execute connection control of the base station apparatus; and
    a control section that, when the detection signal is a given signal sequence, establishes connection with the base station apparatus based on the associated control signal,
    wherein, when the detection signal is the given signal sequence, the receiving section does not receive associated control signals from other base station apparatuses.

2. The mobile terminal apparatus according to claim 1, wherein the associated control signal comprises at least one of control information for DACH (Direct Access Channel) transmission and a control signal for ePDCCH (enhanced physical downlink control channel) reception.

3. The mobile terminal apparatus according to claim 1, wherein the associated control signal comprises at least one of control information for DACH (Direct Access Channel) transmission and a control signal for ePDCCH (enhanced physical downlink control channel) reception.

4. The mobile terminal apparatus according to claim 2, wherein a frequency to allocate the detection signal is higher than a frequency to allocate DACH by the control information for DACH transmission.

5. The mobile terminal apparatus according to claim 1, wherein the detection signal is a discovery signal.

6. A base station apparatus that is able to connect to a mobile terminal apparatus, the base station apparatus comprising:
    a transmitting section that transmits a detection signal that is a given signal sequence to be used to detect the base station apparatus and an associated control signal that is attached to the detection signal and is to be used to execute connection control of the base station apparatus; and
    a control section that establishes connection with the mobile terminal apparatus based on information transmitted from the mobile terminal apparatus in accordance with the associated control signal,
    wherein, when the detection signal is the given signal sequence, a receiving section of the mobile terminal apparatus does not receive associated control signals from other base station apparatuses.

7. A method for establishing connection in a mobile terminal apparatus, the method comprising the steps of:
    receiving a detection signal that is to be used to detect a base station apparatus and an associated control signal that is attached to the detection signal and is to be used to execute connection control of the base station apparatus; and
    when the detection signal is a given signal sequence, establishing connection with the base station apparatus based on the associated control signal,
    wherein, when the detection signal is the given signal sequence, a receiving section of the mobile terminal apparatus does not receive associated control signals from other base station apparatuses.

* * * * *